(12) United States Patent
Park et al.

(10) Patent No.: US 12,499,556 B2
(45) Date of Patent: Dec. 16, 2025

(54) SIDE OUTER EXTRACTION SYSTEM AND METHOD

(71) Applicants: Hyundai Motor Company, Seoul (KR); Kia Corporation, Seoul (KR); Research & Business Foundation SUNGKYUNKWAN UNIVERSITY, Suwon-si (KR)

(72) Inventors: SungHyun Park, Anyang-Si (KR); Sang Hwan Jun, Suwon-Si (KR); Jee-Hyong Lee, Seoul (KR); Eun-Ho Lee, Seoul (KR); Tae-Hyun Kim, Suwon-Si (KR); Jin Sub Lee, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 198 days.

(21) Appl. No.: 18/230,915

(22) Filed: Aug. 7, 2023

(65) Prior Publication Data

US 2024/0153095 A1    May 9, 2024

(30) Foreign Application Priority Data

Nov. 9, 2022   (KR) .................... 10-2022-0148377

(51) Int. Cl.
*G06T 7/12*     (2017.01)
*G06F 18/2415*  (2023.01)
(Continued)

(52) U.S. Cl.
CPC ............ *G06T 7/12* (2017.01); *G06F 18/2415* (2023.01); *G06F 30/12* (2020.01); *G06T 3/18* (2024.01);
(Continued)

(58) Field of Classification Search
None
See application file for complete search history.

(56) References Cited

U.S. PATENT DOCUMENTS 11,216,932 B1 *   1/2022   Checka ................. G06T 7/0002
2016/0141213 A1 * 5/2016   Bishop .................... H01L 24/20
                                                         438/16

(Continued)

FOREIGN PATENT DOCUMENTS

KR          101772916 B1    8/2017
KR       10-2020-0003323 A  1/2020
(Continued)

OTHER PUBLICATIONS

He, K., Gkioxari, G., Dollar, P., & Girshick, R. (2017). Mask r-cnn. In Proceedings of the IEEE international conference on computer vision (pp. 2961-2969).*

(Continued)

*Primary Examiner* — Ryan M Gray
(74) *Attorney, Agent, or Firm* — Banner & Witcoff, Ltd.

(57) ABSTRACT

A side outer extraction method may include receiving, by at least one processor, an image, of a vehicle, preprocessed from three-dimensional (3D) data from a computer-aided design (CAD) module, detecting, using an artificial intelligence model, a classification value and a bounding box for (Continued)

each region, of a plurality of regions, corresponding to one of a plurality of target references of the preprocessed image, transmitting, to the CAD module, a signal indicating the classification value and the bounding box for each region of the plurality of regions, and causing extraction, by the CAD module, of the plurality of target references from the classification value and the bounding box for each region of the plurality of regions, based on the received signal.

19 Claims, 11 Drawing Sheets

(51) Int. Cl.
    *G06F 30/12*     (2020.01)
    *G06T 3/18*     (2024.01)
    *G06T 7/11*     (2017.01)
    *G06T 7/73*     (2017.01)
    *G06T 19/20*     (2011.01)

(52) U.S. Cl.
    CPC .................. *G06T 7/11* (2017.01); *G06T 7/73* (2017.01); *G06T 19/20* (2013.01); *G06T 2200/04* (2013.01); *G06T 2207/20081* (2013.01); *G06T 2207/20084* (2013.01); *G06T 2219/2012* (2013.01)

(56) References Cited

U.S. PATENT DOCUMENTS

| | | | |
|---|---|---|---|
| 2020/0175352 A1* | 6/2020 | Cha | G06N 3/04 |
| 2022/0180620 A1* | 6/2022 | Berechet | G06N 20/20 |
| 2022/0327688 A1* | 10/2022 | Schultz | G06F 30/15 |
| 2023/0230224 A1* | 7/2023 | Erol | G06T 7/0004 |
| | | | 382/141 |
| 2024/0087105 A1* | 3/2024 | Sen | G06T 7/0004 |
| 2024/0311991 A1* | 9/2024 | Craighero | G06T 7/64 |

FOREIGN PATENT DOCUMENTS

| | | |
|---|---|---|
| KR | 102151733 B1 | 9/2020 |
| KR | 10-2021-0028452 A | 3/2021 |
| KR | 10-2021-0089836 A | 7/2021 |

OTHER PUBLICATIONS

Liyun, Xu, et al. "Improved faster R-CNN algorithm for defect detection in powertrain assembly line." Procedia CIRP 93 (2020): 479-484.*

Im, Donggyun, and Jongpil Jeong. "R-CNN-based large-scale object-defect inspection system for laser cutting in the automotive industry." Processes 9.11 (2021): 2043.*

Lee, H. Y. et al. "A study of Development of Automation program for JIG Design in assembly of automobile chassis," DBpia, 4 pages, Sep. 26, 2014.

Choi, K.S. et al. "A study on Design of Machine Vision System for an Automatic Inspection of the Automobile Parts," DBpia, 2 pages, 2018.

Han, Jae Hun et al. "A Case Study on Smart Plant and Monitoring System Implementation of Venture Company for Auto Parts," Asia-Pacific Journal of Business Venturing and Entrepreneurship vol. 12 No. 5 pp. 29-37.

Kim, Tae-Hyun et al. "3D Reference Extraction Algorithm in Vehicle CAD Model Using Deep Learning," KSPE 2021 Autumn Conference, Bexco Busan, Nov. 24-26, 2021.

Tzivelekis, Charalampos et al. "Parametrically automated 3D design and manufacturing for spiral-type free-form models in an interactive CAD/CAM environment," Int J Interact Des manuf (2017), pp. 223-232, Jan. 10, 2015.

Beerel, Peter A. et al. "Opportunities for Machine Learning in Electronic Design Automation," 5 pages.

Kim, Dae-Ho, "Development of Automatic Gear Modeling Module Using Computer Aided Design(CAD)," J. Korean Soc. Mech. Technol, 20(6): pp. 803-808, 2018.

Rha, Wan Yong "A Study on the Development of Automatic Assembly Device for Door Trim Fastener of Automobile," Proceedings of the KSMT Spring Conference 2019, 7 pages.

* cited by examiner

SIDE OUTER EXTRACTION SYSTEM AND METHOD

CROSS-REFERENCE TO RELATED APPLICATION

This application claims priority to and the benefit of Korean Patent Application No. 10-2022-0148377, filed in the Korean Intellectual Property Office on Nov. 9, 2022, the entire contents of which are incorporated herein by reference.

BACKGROUND

(a) Field

The present disclosure relates to a side outer extraction system and a side outer extraction method.

(b) Description of the Related Art

In the manufacturing industry, unmanned and automated facilities are being adopted at an increased rate and the use of artificial intelligence and machine learning models is becoming more important. During the product manufacturing process, the artificial intelligence is being utilized to detect product defects or discriminate products. However, during the model design process, a target line may be manually extracted from a three-dimensional model. This may be a time-consuming process that requires great accuracy so as not to degrade the quality of the line extraction.

Thus, there is an increasing demand for automation of a process of extracting data from three-dimensional (3D) drawings of the designed product.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a system and a method for automatically extracting a reference which represents a line to be extracted from 3D data.

According to one or more example embodiments of the present disclosure, a method may include: receiving, by at least one processor, an image, of a vehicle, preprocessed from three-dimensional (3D) data from a computer-aided design (CAD) module; detecting, using an artificial intelligence model, a classification value and a bounding box for each region, of a plurality of regions, corresponding to one of a plurality of target references of the preprocessed image, the plurality of target references including lines of the vehicle; transmitting, to the CAD module, a signal indicating the classification value and the bounding box for each region of the plurality of regions; and causing extraction, by the CAD module, of the plurality of target references from the classification value and the bounding box for each region of the plurality of regions, based on the received signal.

The method may further include: receiving a training dataset from the CAD module; and performing, using the artificial intelligence model, a learning process associated with a method for detecting the plurality of regions from the preprocessed image based on the training dataset.

The method may further include: providing, by the CAD module, the preprocessed image to an application through a terminal; receiving, by the CAD module and from a manager device, data indicating position values and classification values for a plurality of regions of the preprocessed image; and generating, by the CAD module, the training dataset based on the data.

The plurality of regions may have a box shape. Detecting of the classification value and the bounding box for each region of the plurality of regions may include: generating a feature map from the preprocessed image; deriving at least one region proposal from the feature map; pooling the feature map to a warped feature with a fixed size from the at least one region proposal; generating data indicating a probability distribution that a class for the at least one region proposal is likely to be present, from the warped feature with the fixed size; and defining positions of a plurality of bounding boxes that enclose the plurality of target references with respect to the at least one region proposal from the warped feature with the fixed size.

Detecting of the classification value and the bounding box for each region of the plurality of regions may be based on the data indicating the probability distribution and further based on the positions of the plurality of bounding boxes.

The extraction of the plurality of target references may include: extracting a line from a quadrilateral representing the bounding box based on the classification value for each region.

The position values for the plurality of regions may be for a plurality of segmented regions. Detecting of the classification value and the bounding box for each region of the plurality of regions may include: detecting an object mask in which there is a target reference of the bounding box for each of the plurality of the segmented regions.

Detecting of the classification value and the bounding box for each region of the plurality of regions may further include: generating a feature map from the preprocessed image; deriving at least one region proposal from the feature map; extracting a warped feature with a fixed size by aligning the feature map and the at least one region proposal; generating data indicating a probability distribution that a class for the at least one region proposal is likely to be present from the warped feature with the fixed size; defining positions of a plurality of bounding boxes that enclose the plurality of target references with respect to the at least one region proposal from the warped feature with a fixed size; and generating a mask by predicting whether classes are present in all pixels from the warped feature with the fixed size.

The method may further include: based on the data indicating the probability distribution that the class for the at least one region proposal is likely to be present, based on the positions of the plurality of bounding boxes, and based on the mask, detecting: the classification value for each of the plurality of segmented regions, a target bounding box, and an object mask in the target bounding box.

The plurality of target references may include at least one of: a vehicle fuel filler line, a vehicle roof unit line, a side door boundary line of a vehicle back seat, a tail lamp boundary line of the vehicle back seat, a side door boundary line of a vehicle back lamp, a line of a thickest center surface at a side door side of a vehicle front seat, or a line of a thickest center surface at the side door side of the vehicle back seat.

According to one or more example embodiments of the present disclosure, a system may include: a region detection server configured to: perform a learning process associated with a method for detecting, from a preprocessed image of a vehicle and using an artificial intelligence model, a plurality of regions corresponding to a plurality of target references; and detect, via the learned method, the plurality of regions; and a computer-aided design (CAD) module configured to: extract a rendering image from three-dimensional (3D) data for the vehicle; generate, based on the rendering image, the preprocessed image; generate a training dataset based on a signal received from a management terminal; and extract the plurality of target references from the plurality of regions. The CAD module may include: a preprocessor configured to: extract, from the 3D data, the rendering image for locating a side outer of the vehicle in a front portion of the vehicle; and generate, based on the rendering image, the preprocessed image by adjusting at least one of: a background of a product in the rendering image, a color of the product in the rendering image, a color of a line, thickness of the line, and a shade; and a reference mapper configured to: extract the plurality of target references from the plurality of regions.

The artificial intelligence model may include: a box detector configured to detect, from the preprocessed image, a plurality of first regions having a box shape; and a segmentation detector configured to detect a plurality of second regions segmented from the preprocessed image.

The box detector may include: a backbone network configured to generate, based on the preprocessed image, a feature map; a region proposal network (RPN) layer configured to derive, from the feature map, at least one region proposal; a region of interest (ROI) pooler configured to pool the feature map, from the at least one region proposal, to a warped feature with a fixed size; a classification layer configured to generate data indicating a probability distribution that a class for the at least one region proposal is likely to be present from the warped feature with the fixed size; and a box regression layer configured to define positions of a plurality of bounding boxes that enclose a plurality of target references for each of the at least one region proposal from the warped feature with the fixed size.

The segmentation detector may include: a backbone network configured to generate, based on the preprocessed image, a feature map; a region proposal network (RPN) layer configured to derive, from the feature map, at least one region proposal; a region of interest (ROI) aligner configured to align the feature map with the at least one region proposal to extract a warped feature with a fixed size; a classification layer configured to generate data indicating a probability distribution that a class for the at least one region proposal is likely to be present from the warped feature with the fixed size; a box regression layer configured to define positions of a plurality of bounding boxes that enclose a plurality of target references for each of the at least one region proposal from the warped feature with the fixed size; and a mask branch configured to predict whether a class is present in all pixels from the warped feature with the fixed size to generate a mask.

The CAD module may be further configured to transmit the signal to the region detection server.

The region detection server may be further configured to train, using the training dataset, the artificial intelligence model.

The region detection server may be further configured to detect the plurality of regions using the trained artificial intelligence model.

According to one or more example embodiments of the present disclosure, a computer-readable storage medium may store instructions that, when executed by one or more processors, cause the one or more processors to: receive an image, of a vehicle, preprocessed from three-dimensional (3D) data from a computer-aided design (CAD) module; detect, using an artificial intelligence model, a classification value and a bounding box for each region, of a plurality of regions, corresponding to one of a plurality of target references of the preprocessed image, the plurality of target references including lines of the vehicle; transmit, to the CAD module, a signal indicating the classification value and the bounding box for each region of the plurality of regions; and cause extraction, by the CAD module, of the plurality of target references from the classification value and the bounding box for each region of the plurality of regions, based on the received signal.

According to the present disclosure, based on image data required for artificial intelligence learning from 3D data, a region associated with a line reference to be extracted from the image data is detected, and a line reference is extracted using the detected region, to improve the accuracy of the task by automation of the line extraction process and maintain a uniform quality of the line extraction regardless of the ability of the worker.

DETAILED DESCRIPTION

Figure 1:
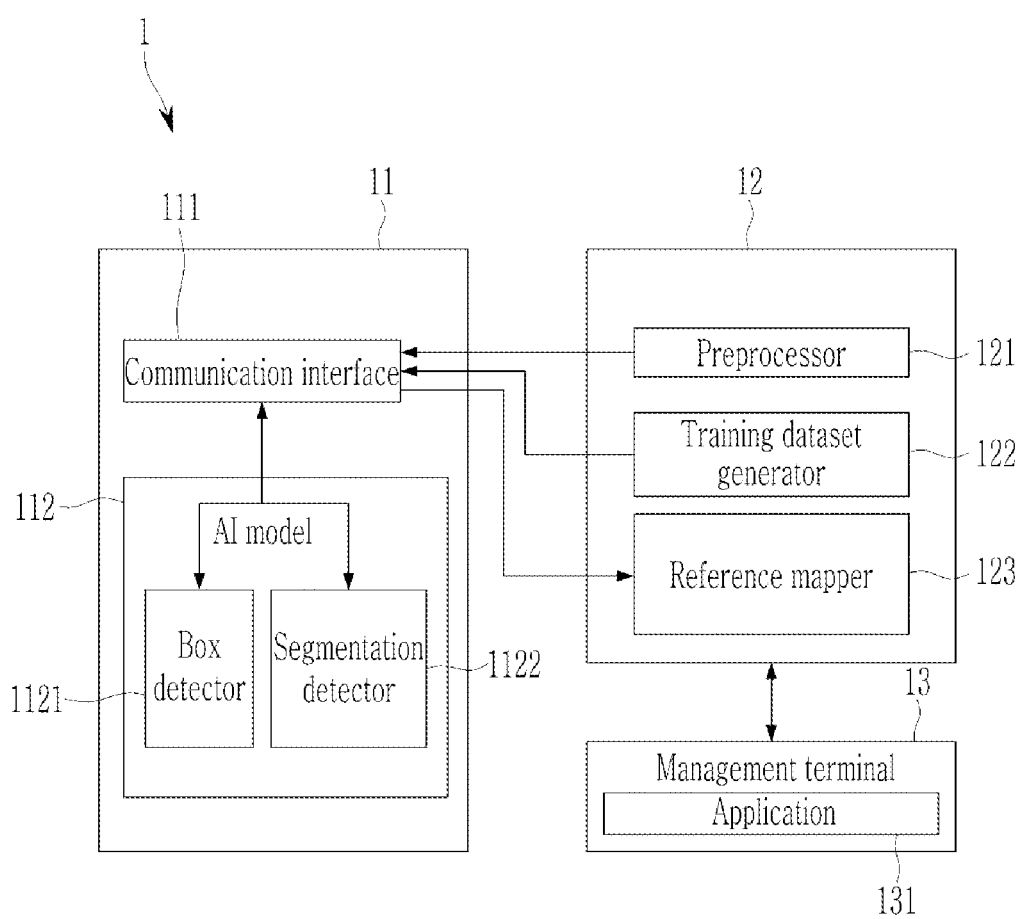
FIG. 1 is a block diagram schematically illustrating a configuration of a side outer extraction system and a computer-aided design (CAD) system.

Hereinafter, one or more example embodiments disclosed in the present disclosure will be described more fully hereinafter with reference to the accompanying drawings. Like constituent elements are denoted by like reference numeral and a redundant description will be omitted. Further, such as "module" and a "unit", suffixes for components used in the following description are given or mixed and used by considering easiness in preparing a specification and do not have a meaning or role distinguished from each other in themselves. In describing the one or more example embodiments disclosed in the present specification, when it is determined that a detailed description of a related publicly known technology may obscure the gist of the one or more example embodiments disclosed in the present specification, the detailed description thereof will be omitted. The accompanying drawings are only for easy understanding of the one or more example embodiments disclosed in this specification, and the technical idea disclosed herein is not limited by the accompanying drawings, and it should be understood to include all modifications, equivalents, and substitutes included in the spirit and scope of the present disclosure.

Terms including ordinal numbers such as first, second, or the like may be used to describe various elements, but the elements are not limited by the terms. The above terms are used only for the purpose of distinguishing one component from another.

In the preset application, terms such as "include" or "have" are intended to designate that a feature, number, step, operation, component, part, or combination thereof described in the specification is present, but it should be understood that this does not preclude the possibility of addition or existence of one or more other features or numbers, steps, operations, components, parts, or combinations thereof.

Among configurations according to an example embodiment, in a configuration which controls the other configuration in a specific control condition, a program implemented by a set of instructions in which a control algorithm required to control the other configuration is implemented may be installed. The control configuration may process input data and stored data according to the installed program to generate output data. The control configuration may include a nonvolatile memory which stores a program and a memory which stores data.

FIG. 1 is a block diagram schematically illustrating a configuration of a side outer extraction system and a computer-aided design (CAD) system.

The extraction system 1 preprocess an image from 3D data for a vehicle, detects a region associated with a reference of a side outer line of the vehicle from the preprocessed image and an image preprocessed with an artificial intelligence model, and extracts a line using the detected region. The artificial intelligence model may be implemented by the learning using a training dataset. The side outer (also referred to as "body side outer," "side outer panel," "side outer body panel," "side body outer panel," "outer side body panel," etc.) represents an outer plate material that makes up a side surface of the vehicle. For example, the 3D data may be CAD data including a side outer of the vehicle. The extraction system 1 detects references indicating a plurality of lines from the vehicle. The extraction system 1 may execute a program (hereinafter, side outer extraction program) configured by control instructions for performing a plurality of steps to extract a side outer of the vehicle. The side outer extraction program is readable by the computer and the extraction system 1 may include a storage unit including a recording medium which stores the outer extraction program. Each of configurations of the extraction system 1 illustrated in FIG. 1 may be defined based on each step performed when the extraction system 1 executes the side outer extraction program.

A plurality of target references may be references indicating each line to be detected from the vehicle. For example, the plurality of target references includes a first target reference indicating a vehicle fuel filler line, a second target reference indicating a vehicle roof unit line, a third target reference indicating a side door boundary line of a vehicle back seat, a fourth target reference indicating a tail lamp boundary line of the back seat, a fifth target reference indicating a side door boundary line of a vehicle back lamp, a sixth target reference indicating a line of the thickest center surface at a side door side of the vehicle front seat, and a seventh target reference indicating a line of the thickest center surface at the side door side of the vehicle back seat.

Hereinafter, for the convenience of description, the plurality of target references is considered as first to seventh target references of the above example.

The extraction system 1 preforms box labeling or segmentation labeling on a plurality of regions corresponding to a plurality of target references having a specific shape from the image data to learn with an object detection and instance segmentation model. The extraction system 1 may detect each target reference from the plurality of regions after predicting the plurality of regions from the image data using the trained model. As described above, the present disclosure is different from the related art method that directly detects the plurality of target references from the vehicle by a human.

The extraction system 1 includes a region detection server 11, a CAD module 12, and a management terminal 13. The cad module 12 is a computer aided design (CAD) system and is implemented by a 3D modeling system such as a CATIA program.

Each of the region detection server 11, the CAD module 12, and the management terminal 13 may be a computing device including a memory which stores instructions for executing programs and at least one processor. Hereinafter, an operation of each of the region detection server 11, the CAD module 12, and the management terminal 13 may be an operation of at least one processor. For example, at least one processor may be a general purpose processor such as a CPU, an AP, or a digital signal processor (DSP), a graphic dedicated processor such as a GPU or a vision processing unit (VPU), or an artificial intelligence dedicated processor such as NPU. At least one processor controls to process input data according to a previously defined operation rule or artificial intelligence model which is stored in the memory. Alternatively, when at least one processor is an artificial intelligence dedicated processor, the artificial intelligence dedicated processor may be designed to have a hardware structure specified to the processing of a specific artificial intelligence model. Each component shown in FIGS. 1-3 may be implemented with hardware (e.g., a computing device), software (e.g., an application, a software module), or a combination of both.

The region detection server 11 may be a computing device including a first memory which stores first instructions for executing at least one first program and at least one first processor which executes the first instructions. At least one first processor may perform an operation of the region detection server 11 to be described below according to at least one first program.

The CAD module 12 may be a computing device including a second memory which stores second instructions for executing at least one second program and at least one second processor which executes the second instructions. At least one second processor may perform an operation of the CAD module 12 to be described below according to at least one second program.

The CAD module 12 generates a preprocessed image and a training dataset for the preprocessed image from the 3D data to transmit the preprocessed image and the training dataset to the region detection server 11. The region detection server 11 receives the preprocessed image and the training dataset from the CAD module 12 and learns a method for extracting a plurality of regions corresponding to the plurality of target references (hereinafter, a plurality of regions) from the preprocessed image through the training dataset.

The plurality of regions may be regions corresponding to the plurality of target references. For example, the plurality of regions includes a first region indicating a region in the vicinity of the vehicle fuel filler which needs to be predicted by the artificial intelligence model to detect a first target reference, a second region indicating a T-shaped region in the vicinity of the vehicle roof unit which needs to be predicted by the artificial intelligence model 112 to detect a second target reference, a third region indicating an empty area between a side door boundary of the vehicle back seat and a region in the vicinity of the fuel filter which needs to be detected by the artificial intelligence model 112 to detect a third target reference, a fourth region indicating an empty region between a tail lamp of the vehicle back seat and a rear fender which needs to be detected by the artificial intelligence model 112 to detect a fourth target reference, a fifth region indicating an empty region between a side door boundary of a vehicle back lamp and a region in the vicinity of the fuel filler which needs to be predicted by the artificial intelligence model to detect a fifth target reference, a 6-1-st region and a 6-2-nd region indicating left and right regions of the thickest center surface at the side door side of the vehicle front seat which need to be detected by the artificial intelligence model 112 to detect a sixth target reference, and a 7-1-st region and a 7-2-nd region indicating left and right regions of the thickest center surface at the side door side of the vehicle back seat which need to be detected by the artificial intelligence model 112 to detect a seventh target reference. Hereinafter, for the convenience of description, the plurality of regions is considered as the first to fifth regions, the 6-1-st region, the 6-2-nd region, a 7-1-st region, and the 7-2-nd region.

The region detection server 11 includes a communication interface (e.g., communication unit) 111 and an artificial intelligence model 112.

The communication interface 111 receives a preprocessed image from a preprocessor 121 and receives a training dataset from a training dataset generator (e.g., training dataset generating unit) 122 and transmits data representing the plurality of regions extracted by the artificial intelligence model 112 to a reference mapper (e.g., reference mapping unit) 123.

The artificial intelligence model 112 learns a method for extracting a plurality of regions from the preprocessed image with the training dataset.

The CAD module 12 extracts a rendering image from the 3D data, transmits the preprocessed image obtained by preprocessing the rendering image to the region detection server 11, generates a training dataset from the preprocessed image, and detects a plurality of target references from the plurality of regions. The CAD module 12 includes a preprocessor 121, a training dataset generator 122, and a reference mapper 123. The CAD module 12 performs wireless/wired communication with the management terminal 13 via a network to exchange data.

The application 131 may be installed in the management terminal 13. A signal which is received to the management terminal 13 from the CAD module 12 is processed as information by an application processor (AP) of the management terminal 13 and the AP may transmit the information to the application 131. The application 131 performs a computation based on information received from the AP and displays the computation result on the management terminal 13 or transmits the computation result to the CAD module 12 through the management terminal 13.

The preprocessor 121 extracts the rendering image from the 3D data and transmits the preprocessed image to the region detection server 11. When the preprocessing unit 121 receives a start request signal of side outer extraction from the region detection server 11, the preprocessor 121 extracts the rendering image which causes the side outer to be located in the front, from the 3D data and generates the preprocessed image from the rendering image.

The CAD module 12 may transmit a signal inquiring whether to start the generation of the artificial training dataset to the application 131 through the management terminal 13. The application 131 may receive a signal indicating the request of generating the artificial intelligence training dataset through the management terminal 13. For example, a manager pushes a "generation (training gen)" button representing the generation of the artificial intelligence training dataset through a GUI displayed on the screen of the management terminal 13 to input the artificial intelligence training dataset generation request. The preprocessor 121 generates the preprocessed image as a response for the artificial intelligence training dataset generating request and transmits the preprocessed image to the region detection server 11. The preprocessor 121 generates the rendering image as a response to the start request of the side outer extraction. The preprocessor 121 determines an angle of the rendering image as predetermined initial information.

The preprocessor 121 changes a background and/or a color of a product, a color and/or thickness of the line from the rendering image or determines an image in which a shade is adjusted as the preprocessed image.

For example, the preprocessing unit 121 changes a background color which is not a main element of the training of the artificial intelligence, from purple which is an existing color to white and changes the target line from blue to white. The preprocessing unit 121 erases a tree of the background and a coordinate system which are not necessary for the training and are differently displayed for every extracted image to interfere with the training.

As described above, the preprocessor 121 colors the target line which is a label. The artificial intelligence model 112 may be trained to recognize a portion colored by the preprocessor 121 as a target line reference.

If a thickness of the target line is not sufficiently thick, a breaking phenomenon may occur depending on a resolution of the image. If the target line is broken, the artificial intelligence model 112 may not recognize the broken lines as belonging to the same line during the training. Accordingly, the preprocessor 121 may set the thickness of the target line to a predetermined level or higher thickness. For example, the preprocessor 121 may set the thickness of the target line as 0.13 mm to 2.6 mm.

The preprocessor 121 adjusts a product shade setting, rather than the main element of the artificial intelligence learning, from the rendering image to set a uniform shade.

The communication interface 111 receives the preprocessed image from the preprocessor 121.

The training dataset generator 122 may generate a training dataset which is label data to train the artificial intelligence model 112 which detects a plurality of regions from the preprocessed image. The training dataset may be data in which positions and a classification are labeled in the plurality of regions of the preprocessed image.

The training dataset generator 122 transmits the preprocessed image to the management terminal 13. The management terminal 13 may transmit data representing a position value and a classification value for each of the plurality of regions of the preprocessed image to the training dataset generator 122. The position value includes information identifying a pixel of the preprocessed image occupied by the corresponding region and the classification value includes information representing a region which corresponds to any of the plurality of target references.

The training dataset generator 122 provides the preprocessed image to the application 131 through the management terminal 13 and the application 131 receives data representing the position values and the classification values for a plurality of regions of the preprocessed image from the manager. For example, the manager selects a box shaped region on the preprocessed image through an input unit of the management terminal 13 and inputs the classification indicated by the region.

The application 131 receives the position information for each of partial regions of the plurality of regions of the preprocessed image as a box shape through the manager terminal 13. Hereinafter, some regions corresponding to the box shaped position information which is input to the application 131, among the plurality of regions, is referred to as a plurality of box regions. The application 131 uses a labeling tool to receive the position and the classification for each of the plurality of boxes. For example, the labeling tool may be "Labelimg". Each of the plurality of box regions includes a position indicating each of a plurality of target references (hereinafter, a plurality of box target references) which needs to be detected as the plurality of box regions. For example, the first region may be a region including a vehicle fuel filler position indicated by the first target reference.

The application 131 may receive the position information of the plurality of box regions and other partial regions, among the plurality of region of the preprocessed image through the management terminal 13 as a segmented format, through the management terminal 13. Hereinafter, some regions corresponding to the segmented position information which is input to the application 131, among the plurality of regions, are referred to as a plurality of segmentation regions. The application may receive image data in which a region which needs to be detected by the manager is displayed with a predetermined color, as a plurality of segmentation regions. For example, the manager colors the plurality of target references which needs to be detected as a plurality of segmentation regions, among the preprocessed images (hereinafter, a plurality of segmentation target reference) with different colors to be input to the application 131. Each of the plurality of segmentation regions includes a part of a position indicated by one target reference corresponding to the segmentation region. For example, the 6-1-st region includes a left region of a line of the thickest center surface at the side door side of the vehicle front seat indicated by the sixth target reference.

The management terminal 13 transmits signals indicating a position value for a plurality of regions of the preprocessed image and a classification value of the corresponding position to the CAD module 12.

The training dataset generator 122 may generate the training dataset based on a signal received from the management terminal 13. Specifically, in the training dataset, each of the plurality of box regions is labeled with a position label indicating a position of a box shaped region and a classification label indicating classification corresponding to the region and each of the plurality of segmentation regions may be labeled with a position label indicating a pixel position of a segmented shape region, rather than box shape and a classification label indicating classification corresponding to the region.

The CAD module 12 transmits a signal inquiring whether to start side outer extraction to the application 131 through the management terminal 13. The application 131 receives a signal indicating a side outer extraction request through the management terminal 13. For example, the manager may input a side outer extraction request signal by pushing "extraction (prediction)" button indicating the start of the side outer extraction after inputting a directory, a resolution, and a virtual environment name through a graphic user interface (GUI) displayed on the screen of the management terminal 13. The CAD module 12 transmits the side outer extraction request signal to the region detection server 11. The artificial intelligence model 112 may learn a method for detecting a plurality of regions from the preprocessed image through the training dataset.

Hereinafter, data labeled with position labels indicating positions of the plurality of box regions and a classification label indicating classification corresponding to the region is referred to as box label data, and data labeled with a position label indicating a pixel position of the segmentation region and a classification label indicating classification corresponding to the region is referred to as segmentation label data. For example, each of first to fifth regions is box label data, each of the 6-1-st region, the 6-2-nd region, a 7-1-st region, the 7-2-nd region may be segmentation label data.

The communication interface 111 may receive the training dataset from the training dataset generator 122.

The artificial intelligence model 112 includes a box detector (e.g., box detecting unit) 1121 and a segmentation detector (e.g., segmentation detecting unit) 1122.

The box detector 1121 may be an artificial intelligence model which detects a target reference corresponding to the box label data from the preprocessed image through the box label data. The box detector 1121 may be implemented by a Faster R-CNN model with the box label data as learning data. Hereinafter, an operation for each detailed configuration of a box detector 1121 will be described with reference to FIG. 2.

Figure 2:
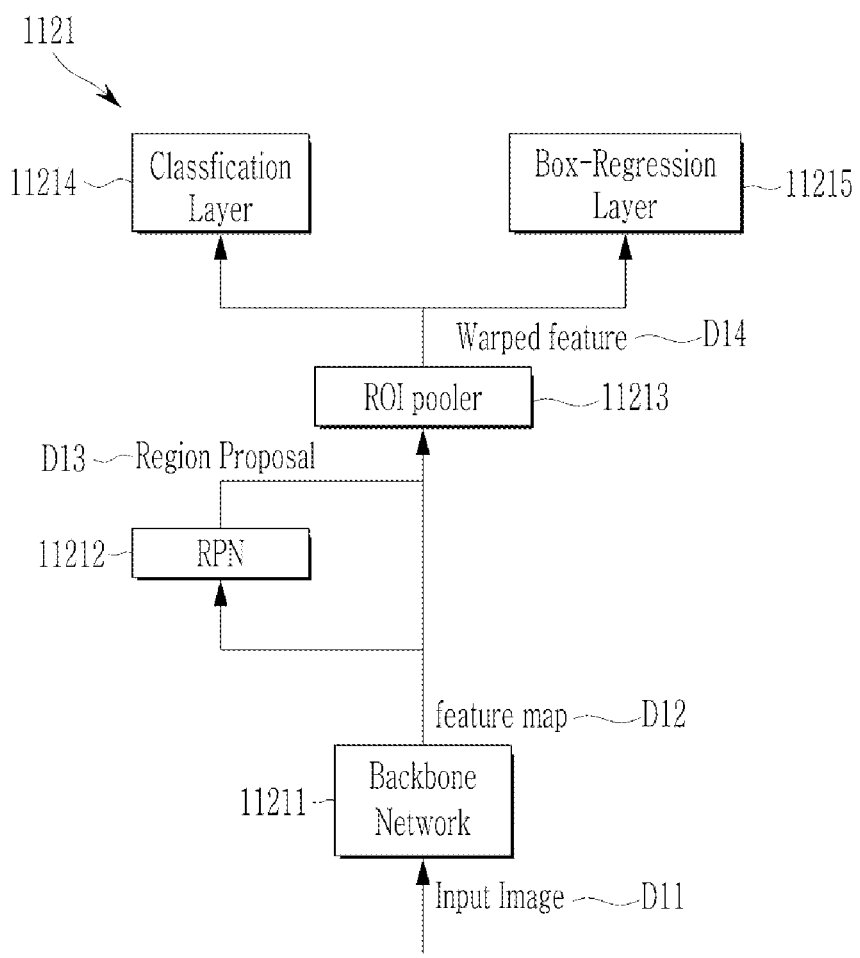
FIG. 2 is a block diagram schematically illustrating details of a box detecting unit of FIG. 1.

FIG. 2 is a block diagram schematically illustrating a detailed configuration of a box detector.

The box detector 1121 includes a backbone network layer 11211, a region proposal network (RPN) layer 11212, a region of interest (ROI) pooler (e.g., ROI pooling unit) 11213, a classification layer 11214, and a box regression layer 11215.

The backbone network layer 11211 extracts a feature map D12 from the input image D11. Here, the input image D11 may be a preprocessed image. The backbone network layer 11211 detects various semantics of the input image D11 to deform the input image D11 into a feature map D12. In the backbone network layer 11211, the preprocessed image is input as the input image D11 and the box label data is input as training data. The backbone network layer 11211 may be implemented as a convolutional neural network (CNN).

The RPN layer 11212 selects a region proposal D13 in which a target reference is likely to be located from the feature map D12. The feature map D12 may be input to the RPN layer 11212. The RPN layer 11212 may output positions in which the target reference is likely to be located as a region proposal D13. The RPN layer 11212 performs the convolution operation on the feature map D12 to generate an intermediate feature map. The RPN layer 11212 derives two output values for every region proposal D12 by performing 11 convolution on the intermediate feature map. Here, two output values may be a value for predicting the presence of the object by the classification layer 11214 and a value for predicting a position of the object by the box regression layer 11215.

When the RPN layer 11212 performs the convolution operation, the RPN layer 11212 generates k (k is a natural number) anchor boxes. k anchor boxes have different horizontal-vertical ratios of the anchor box and different anchor sizes. The anchor box may have a box shaped region to assume a shape of the object to be detected by the network. The RPN layer 11212 learns a method for selecting the region of interest D13 from the feature map D12 by end-to-end. The RPN layer 11212 derives values for region proposals D13 for every k anchor boxes. For example, the RPN layer 11212 outputs a probability that each anchor box is a target reference as a classification loss by means of the Softmax function to obtain a classification prediction value. Further, the RPN layer 11212 regresses the anchor boxes to obtain a bounding box regression (BBR) prediction value to output values which may express four coordinates of bounding box proposals obtained as each anchor box. Four coordinates of bounding box proposals may be coordinates for representing a position and a size of the bounding box proposal. For example, four coordinates of each bounding box proposal may be an x coordinate value of a center point, a y coordinate value of the center point, a width value of a box, and a height value of the box. Data for the region proposal D13 which is output by the RPN layer 1212 includes a classification loss value for the region proposal D13 and four coordinates of the bounding box proposal for the region proposal D13.

The ROI pooler 11213 pools the feature map D12 from the region proposal D13 to a warped feature D14 with a fixed size. The ROI pooler 11213 receives the feature map D12 from the backbone network layer 11211 and receives data for the region proposal D13 from the RPN layer 11212. The ROI pooler 11213 performs max-pooling on portions corresponding to the ROI features having different sizes to output the warped feature D14 with the fixed size from the feature map.

The classification layer 11214 classifies a class of a corresponding region among the plurality of box regions from the warped feature D14 with a fixed size. The class may be one of classification indicating each of the plurality of target references. The classification layer 11214 may generate data indicating a probability distribution that a class for the region proposal D13 is likely to be present. The classification layer 11214 may derive a classification loss from the warped feature with a fixed size. The classification layer 11214 may determine that the object corresponds to the same classification as the target reference based on the classification loss.

The box regression layer 11215 may predict a position of the bounding box in which the target reference is likely to be present, from the warped feature D14 with a fixed size. The box regression layer 11215 may derive a bounding box regression loss from the warped feature with a fixed size. The box regression layer 11215 redefines the position of the bounding box such that each of the bounding boxes accurately surrounds each of the plurality of target references based on the bounding box regression loss in the region proposal D13.

The segmentation detector 1122 may be an artificial intelligence model which detects a target reference corresponding to each segmentation label data from the preprocessed image through the segmentation label data. The segmentation detector 1122 may be implemented by the MASK R-CNN model with the segmentation label data as training data. Hereinafter, an operation of every detailed configuration of the segmentation detector 1122 will be described with reference to FIG. 3.

Figure 3:
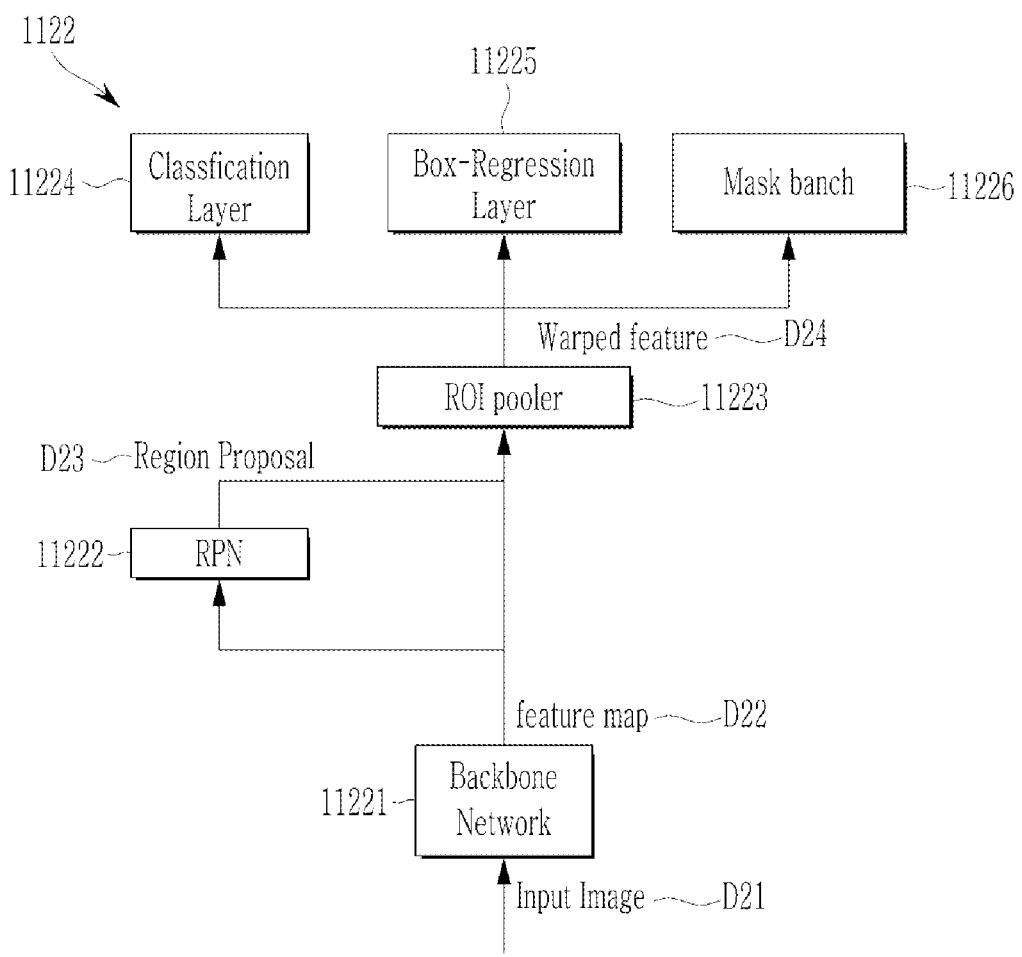
FIG. 3 is a block diagram schematically illustrating detailed configurations of a segmentation detector of FIG. 1.

FIG. 3 is a block diagram schematically illustrating detailed configurations of a segmentation detector of FIG. 1.

The segmentation detector 1122 includes a backbone network layer 11221, an RPN layer 11222, a ROI aligning unit 11223, a classification layer 11224, a box regression layer 11225, and a mask branch 11226.

The repeated description with the operation of the box detector 1121, in the description of the segmentation detector 1122, will be omitted below.

The back network layer 11211 extracts a feature map D22 from an input image D21.

The RPN layer 11212 selects positions in which the target reference is likely to be present, from the feature map D22 as a region proposal D23.

The ROI aligning unit 11223 outputs a warped feature D24 with a fixed size from the feature map D23 and the region proposal D23. The ROI aligning unit 11223 aligns the extracted feature with the region of interest D23 to output the warped feature D24 with a fixed size using bilinear interpolation. When the ROI spans multiple pixels, the ROI aligning unit 11223 reflects all the multiple pixels using the bilinear interpolation, which is different from the ROL pooler 11213 which pools in the pixel unit.

The classification layer 11224 classifies a class of the corresponding region, among the plurality of box regions, from the warped feature D23 with a fixed size.

The box regression layer 11215 may predict a position of the bounding box in which the target reference is likely to be present, from the warped feature D24 with a fixed size.

The mask branch 11226 predicts whether the class is present, for all the pixels in the warped feature D24 with a fixed size to generate a mask. The mask branch 11226 predicts a binary mask distinguishing whether to be a target reference regardless of the class. The mask branch 11226 may be implemented based on a fully connected network (FCN).

The communication interface 111 transmits a signal indicating a plurality of regions generated by the box detector 1121 and the segmentation detector 1122 to the reference mapper 123.

Hereinafter, each step of a side outer extraction method according to one or more example embodiments of the present disclosure will be described with reference to FIG. 4.

Figure 4:
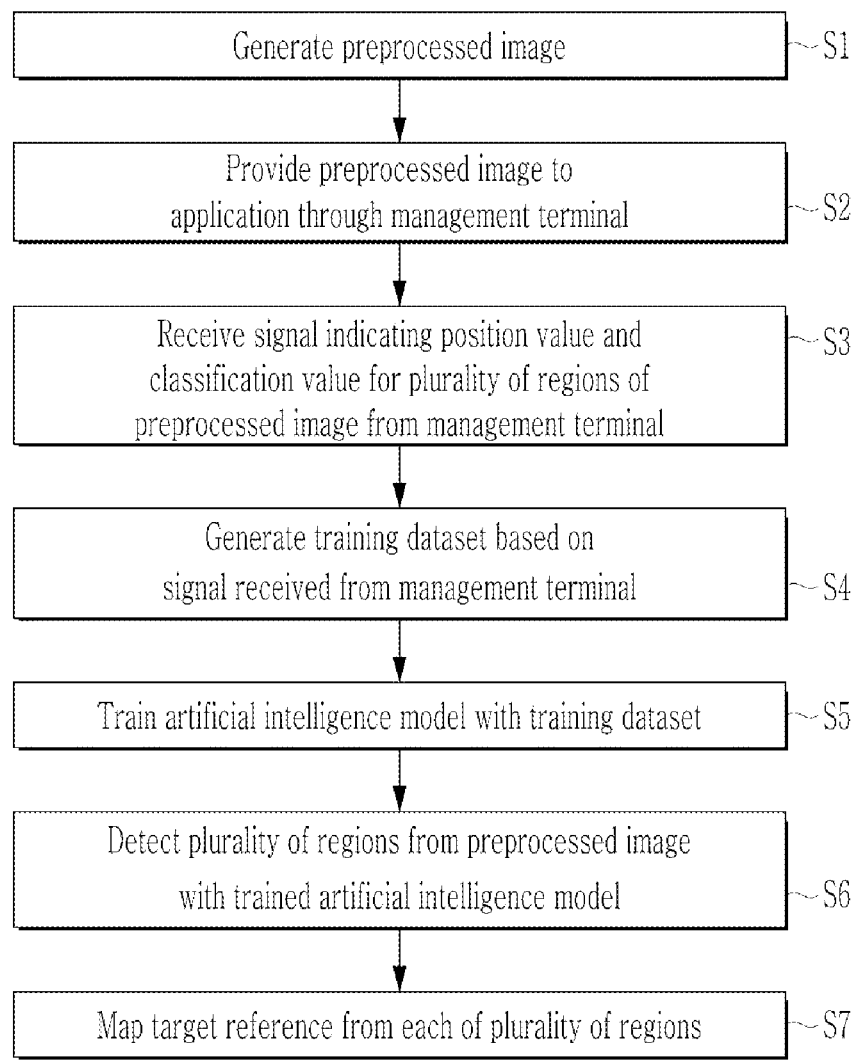
FIG. 4 is a flowchart of a side outer extraction method.

FIG. 4 is a flowchart of a side outer extraction method.

The preprocessor 121 generates a preprocessed image from 3D data in step S1. The preprocessor 121 extracts a rendering image from the 3D data and generates a preprocessed image obtained by preprocessing the rendering image to transmit the preprocessed image to the region detection server 11. The preprocessed image may be transmitted to the management terminal 13.

The CAD module 12 provides the preprocessed image to the application 131 through the management terminal 13 in step S2. The manager may input data representing a position value and a classification value for each of the plurality of regions to the application 131 through the management terminal 13.

The CAD module 12 receives signals indicating the position values and the classification values for the plurality of regions of the preprocessed image from the management terminal 13 in step S3.

The training dataset generator 122 may generate the training dataset based on a signal received from the management terminal 13 in step S4.

The artificial intelligence model 112 is trained with the training dataset in step S5.

The artificial intelligence model 112 may learn a method for detecting a plurality of regions from the preprocessed image with the training dataset. The plurality of box target references may be detected using a plurality of box region information so that the box detector 1121 is an object detection model to learn a method for detecting a plurality of box regions. For example, the box detector 1121 is implemented by a faster R-CNN model. The backbone network layer 11211, the RPN layer 11212, the ROI pooler 11213, the classification layer 11214, and the box regression layer 11215 may learn the method for detecting a plurality of box regions from the preprocessed data with the plurality of box label data as a training dataset.

The plurality of segmentation target references is detected using a plurality of segmentation region information so that the segmentation detector 1122 learns a method for detecting a plurality of segmentation regions with an instant segmentation model. For example, the segmentation detector 1122 may be implemented by a Mask R-CNN model. The backbone network layer 11221, the RPN layer 11222, the ROI aligning unit 11223, the classification layer 11224, the box regression layer 11225, and the mask branch 11226 may learn the method for detecting a plurality of segmentation regions from the preprocessed data with the plurality of segmentation label data as training datasets.

The region detection server 11 detects the plurality of regions from the preprocessed image with the trained artificial intelligence model 112.

The box detector 1121 detects a classification value and a target bounding box for each of the plurality of box regions based on the data representing a probability distribution that the class for at least one region proposal D13 is present and the position of the plurality of bounding boxes. Here, the target bounding box represents a bounding box in which the box target reference is present, among the plurality of bonding boxes.

The segmentation detector 1122 detects a classification value for each of the plurality of segmentation regions, a target bounding box, and an object mask in which the segmentation target reference is present in the target bounding box, based on data representing a probability distribution that a class for at least one region proposal D23 is likely to be present, the positions of the plurality of bounding boxes, and the mask. Here, the target bounding box may represent a bounding box in which the segmentation target reference is present, among the plurality of bounding boxes.

The reference mapper 123 maps the target reference from each of the plurality of regions which is an output of the trained artificial intelligence model 112 in step S7.

The reference mapper 123 maps with another algorithm according to a type of the target reference to be detected. The reference mapper 123 extracts one line from a quadrilateral representing the bounding box as a target reference or extracts one line from an object mask shape of the bounding box as a target reference.

Hereinafter, an operation of extracting first to fifth target references from the first to fifth regions by the reference mapper 123 will be described with reference to FIGS. 5 to 9.

Figure 5:
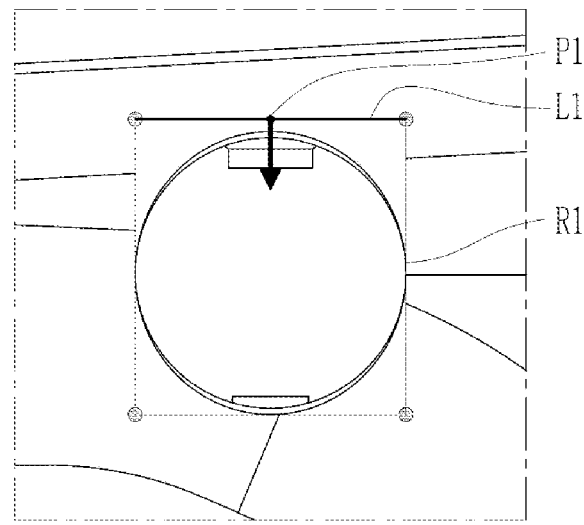
FIG. 5 is an example view for explaining an operation of mapping a first target reference from a first region.

FIG. 5 is an example view for explaining an operation of mapping a first target reference from a first region.

Referring to FIG. 5, the box detector 1121 may output a first region R1 illustrated within a quadrilateral with dotted lines quadrilateral. The reference mapper 123 recognizes and extracts a second clickable line as a first target reference when a black color reference is clicked while moving downward by one pixel from a center point P1 of an upper line segment L1 of the first region R1.

Figure 6:
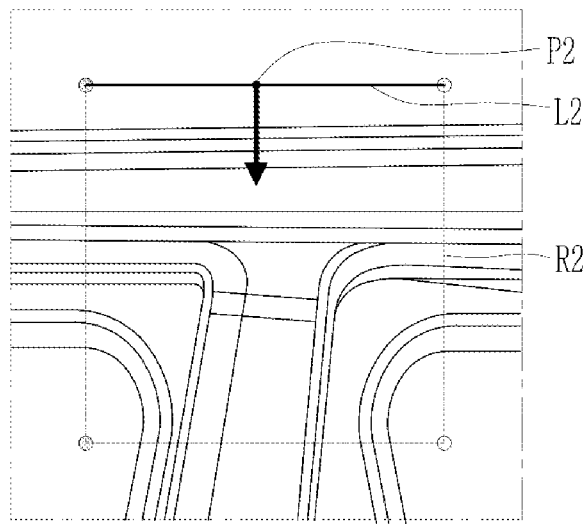
FIG. 6 is an example view for explaining an operation of mapping a second target reference from a second region.

FIG. 6 is an example view for explaining an operation of mapping a second target reference from a second region.

Referring to FIG. 6, the box detector 1121 may output a second region R2 illustrated within a quadrilateral with dotted lines. The reference mapper 123 recognizes and extracts a second clickable line as a second target reference when a black color reference is clicked while moving downward by one pixel from a center point P2 of an upper line segment L2 of the second region R2.

Figure 7:
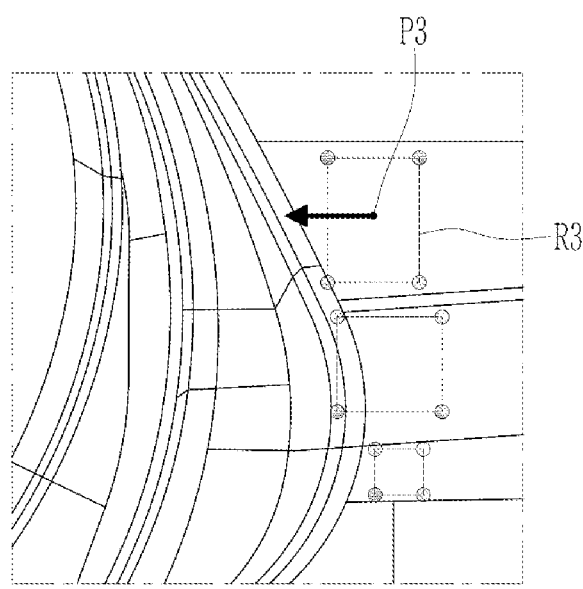
FIG. 7 is an example view for explaining an operation of mapping a third target reference from a third region.

FIG. 7 is an example view for explaining an operation of mapping a third target reference from a third region.

Referring to FIG. 7, the box detector 1121 may output a third region R3 illustrated in a quadrilateral with dotted lines. The reference mapper 123 recognizes and extracts a second clickable line as a third target reference when a black color reference is clicked while moving to the left by one pixel from a center point P3 of the third region R3.

Figure 8:
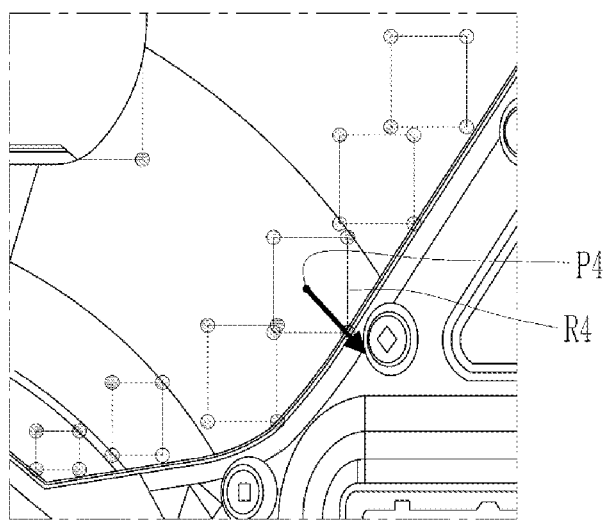
FIG. 8 is an example view for explaining an operation of mapping a fourth target reference from a fourth region.

FIG. 8 is an example view for explaining an operation of mapping a fourth target reference from a fourth region.

Referring to FIG. 8, the box detector 1121 may output a fourth region R4 illustrated in a quadrilateral with dotted lines. The reference mapper 123 recognizes and extracts a second clickable line as a fourth target reference when a black color reference is clicked while moving to the right lower direction by one pixel from a center point P4 of the fourth region R4.

Figure 9:
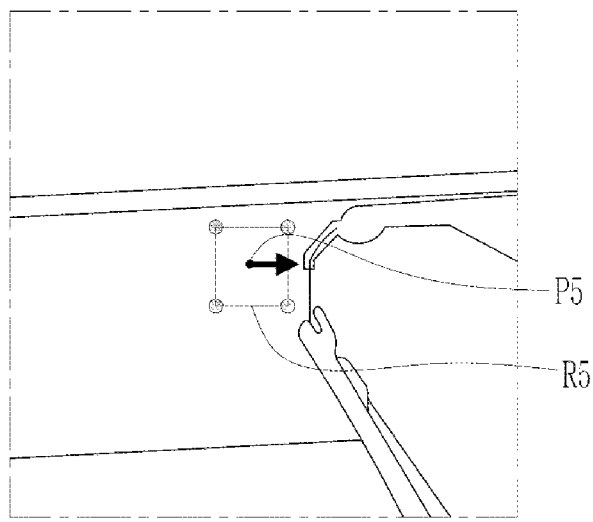
FIG. 9 is an example view for explaining an operation of mapping a fifth target reference from a fifth region.

FIG. 9 is an example view for explaining an operation of mapping a fifth target reference from a fifth region.

Referring to FIG. 9, the box detector 1121 may output a fifth region R5 illustrated in a quadrilateral with dotted lines. The reference mapper 123 recognizes and extracts a second clickable line as a fifth target reference when a black color reference is clicked while moving to the right direction by one pixel from a center point of the fifth region R5.

Hereinafter, an operation of extracting a sixth target reference and a seventh target reference from a 6-1-st region, a 6-2-nd region, a 7-1-st region, and a 7-2-nd region by the reference mapper 123 will be described with reference to FIGS. 10 and 11. The sixth target reference includes a 6-1-st target reference and a 6-2-nd target reference and the seventh target reference includes a 7-1-st target reference and a 7-2-nd target reference.

Figure 10:
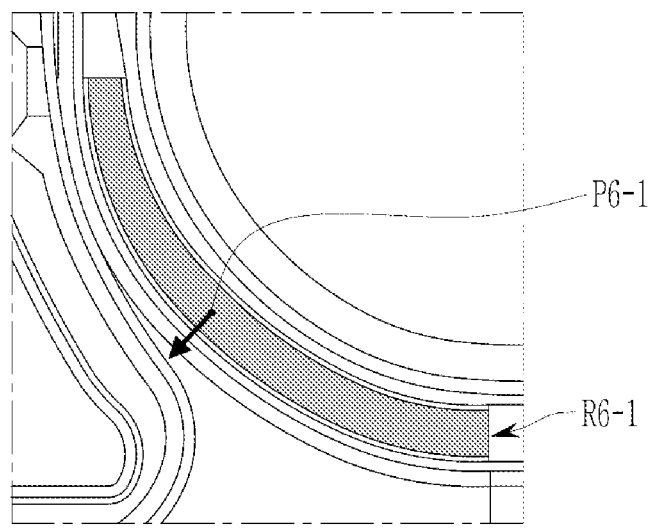
FIG. 10 is an example view for explaining an operation of mapping a 6-1-st target reference from a 6-1-st region.

FIG. 10 is an example view for explaining an operation of mapping a 6-1-st target reference from a 6-1-st region.

Referring to FIG. 10, the segmentation detector 1122 outputs a 6-1-st region R6-1. The reference mapper 123 recognizes and extracts a second clickable line as a 6-1-st target reference when a black color reference is clicked while moving left-downward by one pixel from a center of gravity of the 6-1-st region R6-1.

Further, the segmentation detector 1122 outputs a 7-1-st region R6-1. In the same way, the reference mapper 123 recognizes and extracts a second clickable line as a 7-1-st target reference when a black color reference is clicked while moving left-downward by one pixel from a center of gravity of the 7-1-st region.

Figure 11:
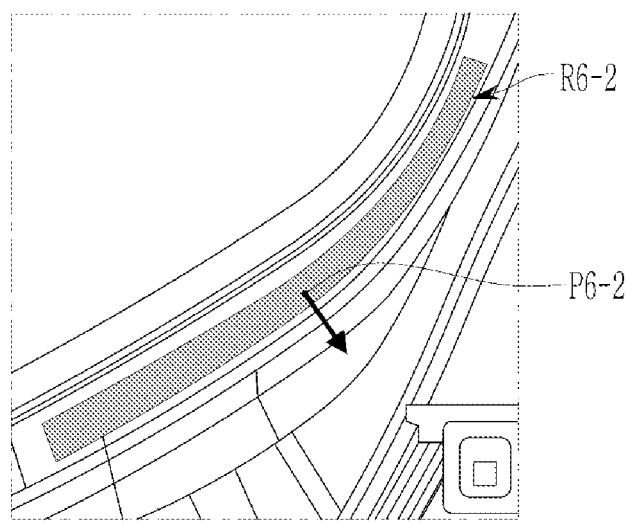
FIG. 11 is an example view for explaining an operation of mapping a 6-2-nd target reference from a 6-2-nd region.

FIG. 11 is an example view for explaining an operation of mapping a 6-2-nd target reference from a 6-2-nd region.

Referring to FIG. 10, the segmentation detector 1122 outputs a 6-2-nd region R6-2. The reference mapper 123 recognizes and extracts a second clickable line as a 6-2-nd target reference when a black color reference is clicked while moving right-downward by one pixel from a center of gravity of the 6-2-nd region R6-2.

Further, the segmentation detector 1122 outputs a 7-2-nd region R7-2. In the same way, the reference mapper 123 recognizes and extracts a second clickable line as a 7-2-nd target reference when a black color reference is clicked while moving left-downward by one pixel from a center of gravity of the 7-2-nd region.

As described above, the reference mapper 123 maps the plurality of target references. The reference mapper 123 transmits a signal representing the plurality of target references to the application 131.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A method comprising:
    receiving, by at least one processor, an image, of a vehicle, preprocessed from three-dimensional (3D) data from a computer-aided design (CAD) module;
    detecting, using an artificial intelligence model, a classification value and a bounding box for each region, of a plurality of regions, corresponding to one of a plurality of target references of the preprocessed image, wherein the plurality of target references comprise lines of the vehicle;
    transmitting, to the CAD module, a signal indicating the classification value and the bounding box for each region of the plurality of regions; and
    causing extraction, by the CAD module, of the plurality of target references from the classification value and the bounding box for each region of the plurality of regions, based on the received signal,
    wherein each of the plurality of regions is a box-shaped region or a segmentation region, and
    wherein the extraction of the plurality of target references comprises extracting, by the CAD module, as each target reference of the plurality of target references, a line including a black-color pixel by moving pixel-by-pixel in a predetermined direction from a predetermined reference point within each region.

2. The method of claim 1, further comprising:
    receiving a training dataset from the CAD module; and
    performing, using the artificial intelligence model, a learning process associated with a method for detecting the plurality of regions from the preprocessed image based on the training dataset.

3. The method of claim 2, further comprising:
    providing, by the CAD module, the preprocessed image to an application through a terminal;
    receiving, by the CAD module and from a manager device, data indicating position values and classification values for a plurality of regions of the preprocessed image; and
    generating, by the CAD module, the training dataset based on the data.

4. The method of claim 3, wherein the plurality of regions have a box shape, and
    wherein the detecting of the classification value and the bounding box for each region of the plurality of regions comprises:
        generating a feature map from the preprocessed image;
        deriving at least one region proposal from the feature map;
        pooling the feature map to a warped feature with a fixed size from the at least one region proposal;
        generating data indicating a probability distribution that a class for the at least one region proposal is likely to be present, from the warped feature with the fixed size; and
        defining positions of a plurality of bounding boxes that enclose the plurality of target references with respect to the at least one region proposal from the warped feature with the fixed size.

5. The method of claim 4, wherein the detecting of the classification value and the bounding box for each region of the plurality of regions is based on the data indicating the probability distribution and further based on the positions of the plurality of bounding boxes.

6. The method of claim 5, wherein the extraction of the plurality of target references comprises:
    extracting a line from a quadrilateral representing the bounding box based on the classification value for each region.

7. The method of claim 3, wherein the position values for the plurality of regions are for a plurality of segmented regions, and
    wherein the detecting of the classification value and the bounding box for each region of the plurality of regions comprises:
        detecting an object mask in which there is a target reference of the bounding box for each of the plurality of the segmented regions.

8. The method of claim 7, wherein the detecting of the classification value and the bounding box for each region of the plurality of regions further comprises:
    generating a feature map from the preprocessed image;
    deriving at least one region proposal from the feature map;
    extracting a warped feature with a fixed size by aligning the feature map and the at least one region proposal;
    generating data indicating a probability distribution that a class for the at least one region proposal is likely to be present from the warped feature with the fixed size;
    defining positions of a plurality of bounding boxes that enclose the plurality of target references with respect to the at least one region proposal from the warped feature with a fixed size; and
    generating a mask by predicting whether classes are present in all pixels from the warped feature with the fixed size.

9. The method of claim 8, further comprising:
    based on the data indicating the probability distribution that the class for the at least one region proposal is likely to be present, based on the positions of the plurality of bounding boxes, and based on the mask, detecting:
        the classification value for each of the plurality of segmented regions,
        a target bounding box, and
        an object mask in the target bounding box.

10. The method of claim 1, wherein the plurality of target references comprise at least one of: a vehicle fuel filler line, a vehicle roof unit line, a side door boundary line of a vehicle back seat, a tail lamp boundary line of the vehicle back seat, a side door boundary line of a vehicle back lamp, a line of a thickest center surface at a side door side of a vehicle front seat, or a line of a thickest center surface at the side door side of the vehicle back seat.

11. A system comprising:
    a region detection server configured to:
        perform a learning process associated with a method for detecting, from a preprocessed image of a vehicle and using an artificial intelligence model, a plurality of regions corresponding to a plurality of target references; and detect, via the learned method, the plurality of regions; and a computer-aided design (CAD) module configured to:
extract a rendering image from three-dimensional (3D) data for the vehicle;
generate, based on the rendering image, the preprocessed image;
generate a training dataset based on a signal received from a management terminal; and
extract the plurality of target references from the plurality of regions,
wherein each of the plurality of regions is a box-shaped region or a segmentation region, and
wherein the CAD module is further configured to extract, as each target reference of the plurality of target references, a line including a black-color pixel by moving pixel-by-pixel in a predetermined direction from a predetermined reference point within each region.

12. The system of claim 11, wherein the CAD module comprises:
a preprocessor configured to:
extract, from the 3D data, the rendering image for locating a side outer of the vehicle in a front portion of the vehicle; and
generate, based on the rendering image, the preprocessed image by adjusting at least one of:
a background of a product in the rendering image,
a color of the product in the rendering image,
a color of a line,
thickness of the line, and
a shade; and
a reference mapper configured to:
extract the plurality of target references from the plurality of regions.

13. The system of claim 11, wherein the artificial intelligence model comprises:
a box detector configured to detect, from the preprocessed image, a plurality of first regions having a box shape; and
a segmentation detector configured to detect a plurality of second regions segmented from the preprocessed image.

14. The system of claim 13, wherein the box detector comprises:
a backbone network configured to generate, based on the preprocessed image, a feature map;
a region proposal network (RPN) layer configured to derive, from the feature map, at least one region proposal;
a region of interest (ROI) pooler configured to pool the feature map, from the at least one region proposal, to a warped feature with a fixed size;
a classification layer configured to generate data indicating a probability distribution that a class for the at least one region proposal is likely to be present from the warped feature with the fixed size; and
a box regression layer configured to define positions of a plurality of bounding boxes that enclose a plurality of target references for each of the at least one region proposal from the warped feature with the fixed size.

15. The system of claim 13, wherein the segmentation detector comprises:
a backbone network configured to generate, based on the preprocessed image, a feature map;
a region proposal network (RPN) layer configured to derive, from the feature map, at least one region proposal;
a region of interest (ROI) aligner configured to align the feature map with the at least one region proposal to extract a warped feature with a fixed size;
a classification layer configured to generate data indicating a probability distribution that a class for the at least one region proposal is likely to be present from the warped feature with the fixed size;
a box regression layer configured to define positions of a plurality of bounding boxes that enclose a plurality of target references for each of the at least one region proposal from the warped feature with the fixed size; and
a mask branch configured to predict whether a class is present in all pixels from the warped feature with the fixed size to generate a mask.

16. The system of claim 11, wherein the CAD module is further configured to transmit the signal to the region detection server.

17. The system of claim 16, wherein the region detection server is further configured to train, using the training dataset, the artificial intelligence model.

18. The system of claim 17, wherein the region detection server is further configured to detect the plurality of regions using the trained artificial intelligence model.

19. A non-transitory computer-readable storage medium storing instructions that, when executed by one or more processors, cause the one or more processors to:
receive an image, of a vehicle, preprocessed from three-dimensional (3D) data from a computer-aided design (CAD) module;
detect, using an artificial intelligence model, a classification value and a bounding box for each region, of a plurality of regions, corresponding to one of a plurality of target references of the preprocessed image, wherein the plurality of target references comprise lines of the vehicle;
transmit, to the CAD module, a signal indicating the classification value and the bounding box for each region of the plurality of regions; and
cause extraction, by the CAD module, of the plurality of target references from the classification value and the bounding box for each region of the plurality of regions, based on the received signal,
wherein each of the plurality of regions is a box-shaped region or a segmentation region, and
wherein the CAD module is further configured to extract, as each target reference of the plurality of target references, a line including a black-color pixel by moving pixel-by-pixel in a predetermined direction from a predetermined reference point within each region.

* * * * *